United States Patent
Hamada et al.

(10) Patent No.: US 6,761,836 B2
(45) Date of Patent: Jul. 13, 2004

(54) PHOSPHOR AND FLOURESCENT DISPLAY DEVICE

(75) Inventors: Takuya Hamada, Chiba (JP); Kazunori Kitagawa, Chiba (JP); Hitoshi Toki, Chiba (JP)

(73) Assignee: Futaba Denshi Kogyo Kabushiki Kaisha, Chiba (JP)

(*) Notice: Subject to any disclaimer, the term of this patent is extended or adjusted under 35 U.S.C. 154(b) by 38 days.

(21) Appl. No.: 09/954,155

(22) Filed: Sep. 18, 2001

(65) Prior Publication Data

US 2002/0057229 A1 May 16, 2002

(30) Foreign Application Priority Data

Sep. 19, 2000 (JP) ............................. 2000-283902

(51) Int. Cl.[7] ............................. C09K 11/56

(52) U.S. Cl. .................................. 252/301.4 S
(58) Field of Search ..................... 252/301.4 S

(56) References Cited

U.S. PATENT DOCUMENTS

| | | | | |
|---|---|---|---|---|
| 3,418,247 A | * | 12/1968 | Yocom | 252/301.4 S |
| RE29,662 E | * | 6/1978 | Yocom | 252/301.4 S |
| 4,275,333 A | * | 6/1981 | Kagami et al. | 313/495 |

* cited by examiner

Primary Examiner—C. Melissa Koslow
(74) Attorney, Agent, or Firm—Bacon & Thomas

(57) ABSTRACT

A yellow light emission phosphor usable in a fluorescent display device does not include cadmium and Eu concentration in the yellow light emission phosphor is reduced to a range of about 0.001 mol % to about 0.1 mol %. The phosphor on a fluorescent display driven at a low voltage generates a yellow light emission with an excellent chromaticity and has a good life span characteristic.

13 Claims, 2 Drawing Sheets

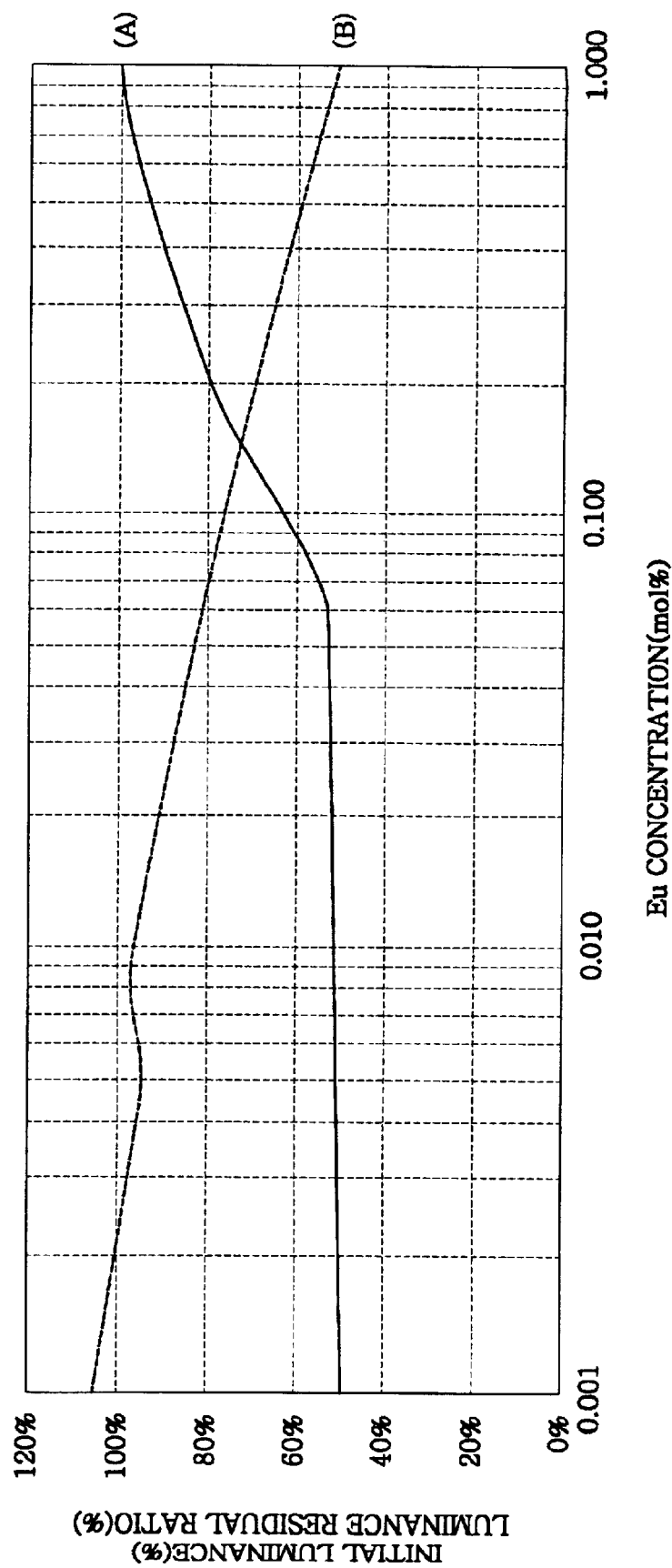

PHOSPHOR AND FLOURESCENT DISPLAY DEVICE

FIELD OF THE INVENTION

The present invention relates to a phosphor and a fluorescent display device; and, more particularly, to a yellow light emission phosphor, which does not include cadmium, usable in a fluorescent display device and a fluorescent display device including such a yellow light emission phosphor.

BACKGROUND OF THE INVENTION

In order to generate yellow to red color in a conventional fluorescent display device, phosphors containing Cd such as (Zn, Cd)S:Ag, Cl or the like have been used. However, present environmental restrictions require a phosphor capable of generating yellow light without using Cd and, therefore, materials such as $La_2O_2S$:Tb or the like have been used as a yellow light emission phosphor.

However, although such a phosphor has an excellent life span in high voltage range, but when it is mixed with a conducting material to be used in a fluorescent display device whose operating anode voltage is 100 V or lower, its life span isn't so good.

SUMMARY OF THE INVENTION

It is, therefore, an object of the present invention to provide a yellow light emission phosphor without including Cd, which can be used in a fluorescent display device whose operating anode voltage is 100 V or lower and has an excellent life span even when it is mixed with a conducting material.

In accordance with a preferred embodiment of the present invention, there is provided an $La_2O_2S$:Eu phosphor emitting yellow light, wherein Eu concentration of the $La_2O_2S$:Eu phosphor is in the range of about 0.001 mol % to about 0.1 mol %.

In accordance with another preferred embodiment of the present invention, there is provided a fluorescent display device comprising an $La_2O_2S$:Eu phosphor, wherein Eu concentration of the $La_2O_2S$:Eu phosphor is in the range of about 0.001 mol % to about 0.1 mol %.

BRIEF DESCRIPTION OF THE DRAWINGS

The above and other objects and features of the present invention will become apparent from the following description of preferred embodiments given in conjunction with the accompanying drawings, in which:

FIG. 2 shows a relation (A) between Eu concentration of each phosphor sample and a relative initial luminance and another relation (B) between the Eu concentration of each phosphor sample and a relative luminance residual ratio after turning on the light of the phosphor sample for about 1000 hours continuously.

DETAILED DESCRIPTION OF THE PREFERRED EMBODIMENTS

Figure 1:
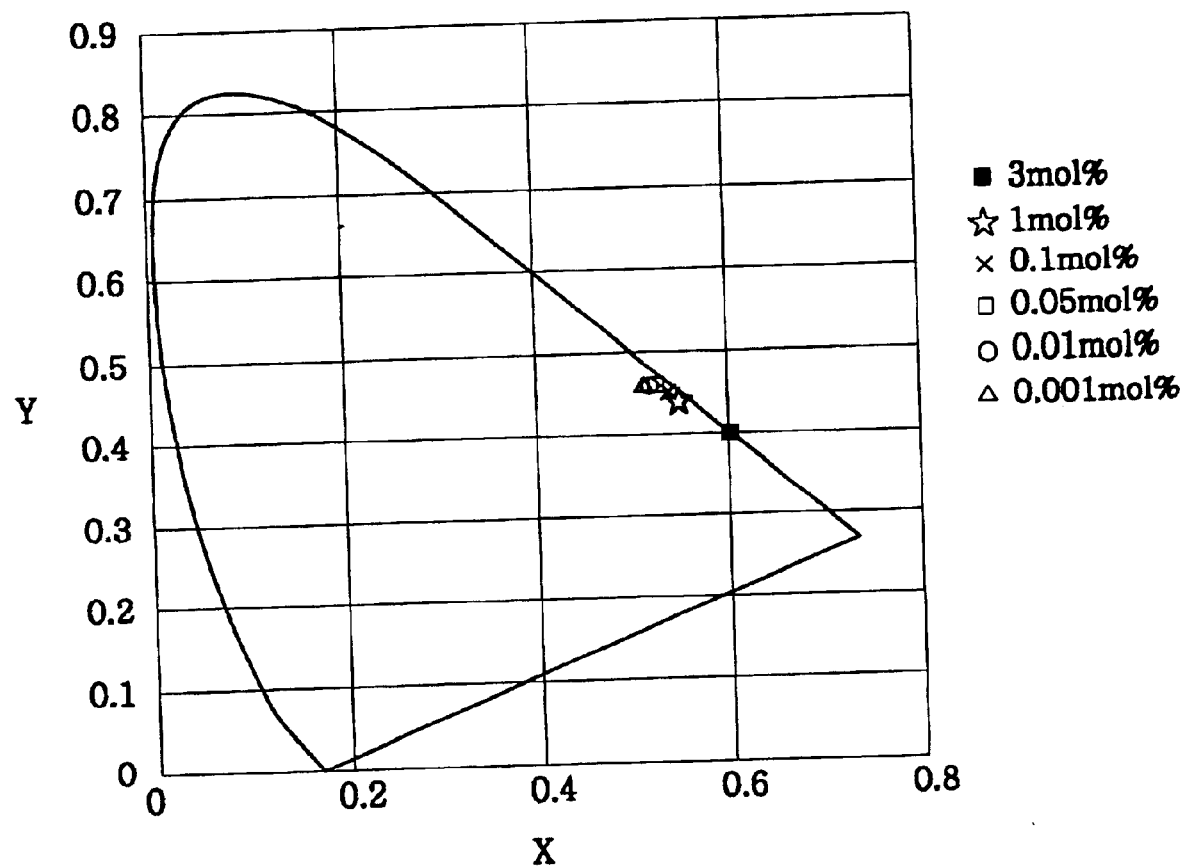
FIG. 1 represents a CIE chromaticity diagram indicating chromaticity of each phosphor sample in accordance with a preferred embodiment of the present invention.

The inventors have investigated various component combinations and different manufacturing methods by using many kinds of materials in order to find a phosphor without including Cd, which may be used to generate a yellow light emission of high purity and has excellent life span characteristics, to be used in a fluorescent display device whose operating anode voltage is about 100 V.

In the investigation, the inventors have studied on an $Ln_2O_2S$:Eu(Ln=Y, La, Gd) phosphor, which generates a red light emission to a methyl orange light emission and is generally used in a cathode ray tube (CRT) that is operated at a high voltage of tens of thousands of voltages. Since, however, the phosphor is used to generate a red light emission at high voltage, the inventors were not interested in the phosphor itself as a phosphor for generating a yellow light emission at a low voltage. Instead, the inventors decided to vary the amount of an additive Eu within the phosphor to check whether a light emission of a different color may be generated.

When Ln was replaced with another element other than La and Eu concentration was changed in the phosphor, it was observed that the color of the light emission did not change to yellow. However, uniquely with $La_2O_2S$:Eu, it was observed that when Eu concentration thereof was changed, a yellow light emission could be generated.

In order to generate a red light emission from an $La_2O_2S$:Eu phosphor, the amount of Eu used to be conventionally added in a range of 0.2 mole % to 5 mole %. However, the inventors manufactured phosphor samples with the Eu concentration varying in a range of about 0.001 mole % to about 0.1 mole % for 1 mole base. After employing a phosphor sample produced as above on a fluorescent display driven at a low voltage of 100 V or lower, the light emission color and the life span characteristics thereof are tested. From the test, it has been observed that the phosphor generates a yellow light emission of high color purity and has an excellent life span characteristic.

EXAMPLE

To a composition with 1.463 g of $Na_2CO_3$ flux, 5 g of $La_2O_3$ source material and 1.461 g of S, $Eu_2O_3$ source material was added as source material with Eu concentration ratio of about 0.001 mol % to about 3 mol % for each mole of $La_2O_3S$. The composition was fired for 1 hour at a temperature of about 1100° C. The fired composition was washed with water and then dried. In this way, 6 phosphor samples of $La_2O_2S$:Eu with Eu concentrations of 3, 1, 0.1, 0.05, 0.01 and 0.001 mol %, respectively, were obtained.

ZnO fines were added by 9 weight % to each phosphor sample as conducting material and, then, each phosphor sample was dispersed in a solvent, in which an organic binder was used, to manufacture a phosphor paste. The phosphor paste was deposited on the anode electrode of the anode substrate in the fluorescent display by using a printing technique and fired to manufacture a final anode substrate. The anode substrate was used to manufacture a fluorescent display for each phosphor sample. Indium oxide may be used as the conducting material. The added portion of Indium oxide is substantially equal to that of ZnO.

Each fluorescent display was driven under an operating condition of 1.7 V of negative electrode voltage (filament voltage), 45 V of anode voltage and 12 V of control electrode voltage.

TABLE 1

| Eu concentration | Chromaticity | |
|---|---|---|
| mol % | X | Y |
| 3 | 0.602 | 0.392 |
| 1 | 0.55 | 0.441 |
| 0.1 | 0.532 | 0.457 |
| 0.05 | 0.524 | 0.465 |
| 0.01 | 0.522 | 0.465 |
| 0.001 | 0.521 | 0.465 |

Table 1 shows a chromaticity for each phosphor sample and FIG. 1 illustrates a chromaticity diagram related therewith.

If Eu concentration is in the range of about 0.001 mol % to about 0.1 mol %, a yellow light emission of a high purity may be obtained. If Eu concentration is 1 mol % or larger, the phosphor turns to be the conventional red to methyl orange light emission phosphor as described above.

FIG. 2 presents a relationship between an initial luminance of the fluorescent display device employing each phosphor sample and a luminance residual ratio after continuously turning the fluorescent display on for 1000 hours.

Referring to FIG. 2, (A) shows the initial luminance. If the relative initial luminance of the conventional phosphor with 1 mol % of Eu concentration is 100, the phosphors with 0.1 mol %, 0.05 mol %, 0.01 mol % and 0.001 mol % of Eu concentrations correspond to 60, 55, 50 and 50 in relative luminance, respectively. In other words, if a yellow light emission of high purity is obtained in the Eu concentration range of about 0.001 mol % to about 0.1 mol %, the initial luminance of the phosphor in accordance with the present invention is lower than that of the conventional red light emission phosphor, but still remains in a range of about 50% of initial luminance of the phosphor in accordance with the present invention, which is good enough for any practical application.

Referring to FIG. 2, (B) shows the life span characteristics of each sample by illustrating the luminance residual ratio after continuously turning on the sample for about 1000 hours. If the luminance residual ratio of the conventional phosphor with 1 mol % of Eu concentration is 50% after continuously turning on the conventional phosphor for about 1000 hours, the luminance residual ratios of the phosphors with 0.1 mol %, 0.05 mol %, 0.01 mol % and 0.001 mol % of Eu concentrations correspond to 75%, 85%, 95% and 105%, respectively. In other words, if a yellow light emission of high purity is obtained in the Eu concentration range of about 0.001 mol % to about 0.1 mol %, the luminance residual ratio of the phosphor in accordance with the present invention is still higher than that of the conventional red light emission phosphor so that the life span characteristics of the phosphor in accordance with the present invention will be greatly enhanced.

As described above, the experiments show that the life span characteristics of the $La_2O_2S:Eu$ phosphor change greatly with strong dependence on the Eu concentration. If, specifically, the Eu concentration is lowered to the range of about 0.001 mol % to about 0.1 mol %, the life span characteristic improves. However, decreasing the Eu concentration improves the life span characteristics only for $La_2O_2S:Eu$ phosphor. For example, the life span characteristics of other phosphor of the same type, e.g., $Gd_2O_2S:Eu$ phosphor, did not improve by lowering the Eu concentration thereof. Therefore, it can be concluded that the phenomenon that the life span characteristics can be improved by lowering the Eu concentration is specific only to the $La_2O_2S:Eu$ phosphor.

In conclusion, in case the Eu concentration in the $La_2O_2S:Eu$ phosphor in accordance with the present invention is in the range of 0.001 mol % to 0.1 mol %, a yellow light emission with an excellent chromaticity may be obtained and the life span characteristics may be enhanced.

While the invention has been shown and described with respect to the preferred embodiments, it will be understood by those skilled in the art that various changes and modifications may be made without departing from the spirit and scope of the invention as defined in the following claims.

What is claimed is:

1. A light emission phosphor comprising an $La_2O_2S:Eu$ phosphor and conducting material, wherein Eu concentration of the $La_2O_2S:Eu$ phosphor is in a range of not less than 0.001 mol % to but less than 0.02 mol %.

2. The light emission phosphor of claim 1, wherein the conducting material is ZnO.

3. The light emission phosphor of claim 1, wherein the $La_2O_2S:Eu$ phosphor generates a yellow light emission.

4. The light emission phosphor of claim 2, wherein the $La_2O_2S:Eu$ phosphor generates a yellow light emission.

5. The light emission phosphor or claim 1, wherein the conducting material is $In_2O_3$.

6. A light emission phosphor of claim 1, wherein Eu concentration is 0.001 mol %.

7. The light emission phosphor of claim 6, wherein the conducting material is $In_2O_3$.

8. The fluorescent display device of claim 6, wherein the conducting material is $In_2O_3$.

9. A fluorescent display device comprising a light emission phosphor including an $La_2O_2S:Eu$ phosphor and conducting material, wherein Eu concentration of the $La_2O_2S:Eu$ phosphor is in a range of not less than 0.001 mol % to but less than 0.02 mol %.

10. The fluorescent display device of claim 9, wherein the conducting material is ZnO.

11. The fluorescent display device of claim 9, wherein the $La_2O_2S:Eu$ phosphor generates a yellow light emission.

12. The fluorescent display device of claim 10, wherein the $La_2O_2S:Eu$ phosphor generates a yellow light emission.

13. The fluorescent display device of claim 9, wherein the conducting material is $In_2O_3$.

* * * * *